(12) United States Patent
Bliton et al.

(10) Patent No.: US 7,253,127 B2
(45) Date of Patent: Aug. 7, 2007

(54) COLORED REINFORCED ARTICLES OF MANUFACTURE AND METHOD OF MAKING THE SAME

(75) Inventors: Richard James Bliton, Greensboro, NC (US); Ladson Lawrence Fraser, Jr., High Point, NC (US); William Oscar Phillips, Greensboro, NC (US); Richard Landis Vockel, Jr., Oak Ridge, NC (US)

(73) Assignee: Precision Fabrics Group, Inc., Greensboro, NC (US)

( * ) Notice: Subject to any disclaimer, the term of this patent is extended or adjusted under 35 U.S.C. 154(b) by 577 days.

(21) Appl. No.: 10/267,105

(22) Filed: Oct. 7, 2002

(65) Prior Publication Data

US 2004/0067711 A1    Apr. 8, 2004

(51) Int. Cl.
*B32B 27/12* (2006.01)
*B32B 27/04* (2006.01)

(52) U.S. Cl. .................. 442/43; 442/164; 442/168; 442/172; 442/180; 442/401; 442/408; 428/131; 428/137; 428/138

(58) Field of Classification Search ................ 442/43, 442/164, 168, 172, 180, 401, 408; 428/131, 428/137, 138
See application file for complete search history.

(56) References Cited

U.S. PATENT DOCUMENTS

| | | | | |
|---|---|---|---|---|
| 3,642,672 A | * | 2/1972 | Kroekel et al. | 523/509 |
| 3,650,864 A | | 3/1972 | Goldsworthy | 156/85 |
| 4,126,719 A | * | 11/1978 | Koyanagi et al. | 428/34.5 |
| 4,302,499 A | | 11/1981 | Grisch | 428/236 |
| 4,445,957 A | | 5/1984 | Harvey | 156/180 |
| 4,469,543 A | | 9/1984 | Segal et al. | 156/283 |
| 4,471,018 A | | 9/1984 | Kritchevsky et al. | 428/220 |
| 4,746,560 A | * | 5/1988 | Goeden | 428/151 |
| 4,888,235 A | * | 12/1989 | Chenoweth et al. | 442/342 |
| 5,135,591 A | | 8/1992 | Vockel, Jr. et al. | 156/67 |
| 5,204,170 A | | 4/1993 | Kuyzin | 428/244 |
| 5,223,330 A | | 6/1993 | Vockel, Jr. et al. | 428/204 |
| 5,905,045 A | | 5/1999 | Vockel, Jr. et al. | 442/43 |
| 5,935,498 A | | 8/1999 | Vockel, Jr. et al. | 264/136 |
| 6,013,585 A | | 1/2000 | Foster et al. | 442/43 |
| 2003/0165670 A1 | * | 9/2003 | Gerard et al. | 428/292.1 |

FOREIGN PATENT DOCUMENTS

EP    0206134    10/1989

* cited by examiner

*Primary Examiner*—Ula C. Ruddock
(74) *Attorney, Agent, or Firm*—Myers Bigel Sibley & Sajovec PA

(57) ABSTRACT

The present invention provides a colored reinforced article of manufacture having a substantially uniform distribution of color. The colored reinforced article of manufacture comprises a fiber-reinforced thermosetting resin matrix and a non-apertured colored veil in the thermosetting resin matrix.

8 Claims, No Drawings

COLORED REINFORCED ARTICLES OF MANUFACTURE AND METHOD OF MAKING THE SAME

FIELD OF THE INVENTION

The present invention relates to colored reinforced articles of manufacture having substantially even distribution of color.

BACKGROUND OF THE INVENTION

Fiber reinforced plastic (FRP) articles of manufacture are used in various applications wherein the article must be lightweight and also resistant to corrosion, decay, rust and the like. Such articles can be used to replace articles made from conventional materials such as steel, aluminum and wood. Such FRP articles typically use a thermosetting resin matrix in one form or another.

FRP articles can be made by various methods known in the art, including but not limited to pultrusion, contact and open molding, resin transfer molding (RTM), injection molding, structural reaction injection molding (S-RIM), compression molding and filament winding. Such articles often need to be colored to be suitable for end use, for example, for aesthetic reasons. Coloration is often achieved by painting, gel coating and powder coating. However, such after coloration is time consuming and requires an extra, often messy, step in the manufacturing process.

A solution to avoid these subsequent coloration processes is to add color to the thermosetting resin matrix. When adding color to the resin, the colorant must be evenly distributed throughout the resin matrix. Any color that is not on the surface is wasted. Additionally, the colorant can adversely affect the properties of the resin such as cure rate.

Thus it would be desirable to provide a colored reinforced article of manufacture which does not require a subsequent coloration step.

It would also be desirable to provide a color reinforced article of manufacture which obviates the wasting of sometimes expensive colorant when the colorant is in the resin matrix.

It would also be desirable to provide a color reinforced article of manufacture having a substantially even distribution of color over the entire surface of the article.

SUMMARY OF THE INVENTION

To this end, on embodiment of the present invention provides a colored reinforced article of manufacture having a substantially uniform distribution of color. According to (embodiments of the present invention, the colored reinforced article of manufacture comprises a fiber-reinforced thermosetting resin matrix and a non-appertured colored veil in the thermosetting resin matrix. The term "non-appertured" is intended to mean a veil being porous such that the resin can pass through the veil during methods of manufacturing the article, but not so porous that the uniform color is adversely affected. Stated otherwise, "non-appertured" is not intended to mean a veil that has no pores or holes but instead has some porosity. Namely, the veil has a controlled porosity to allow the resin to pass through while maintaining the uniform color. The non-appertured colored veil preferably has a maximum pore size of about 350 µm, and typically the pore size is from about 10 µm to 300 µm. The term "veil" is intended to mean a structure or substrate having the above-mentioned "non-appertured" properties and can be a fabric, film, scrim, net or the like with a veil fabric being preferred.

Embodiments of the colored reinforced article of manufacture may be manufactured utilizing a variety of FRP methods known to those skilled in the art. In general, a method comprises impregnating reinforced fiber and a non-appertured colored veil, preferably fabric, with a thermosetting resin matrix comprising a thermosetting resin selected from the group consisting of unsaturated polyester, phenolic, epoxy, urethane and vinyl ester resins, and passing the resin-impregnated reinforcing fabric and colored veil fabric through a die or using another molding technique to provide the colored reinforced article of manufacture. A preferred method is to use pultrusion.

DETAILED DESCRIPTION OF THE INVENTION

The present invention will now be described more fully hereinafter. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety.

One embodiment of the present invention provides a colored reinforced article of manufacture having a substantially uniform distribution of color. The colored reinforced article of manufacture comprises a fiber-reinforced thermosetting resin matrix and a non-appertured colored veil fabric in the thermosetting resin matrix.

The non-appertured colored veil is preferably a woven, nonwoven or knitted fabric but as one skilled in the art will recognize can be a film (e.g. perforated plastic film), scrim, net or the like. The veil has a maximum pore size of about 350 µm, and a preferred pore size average of from about 10 µm to 300 µm, preferably from about 20 µm to 200 µm, and more preferably from about 30 µm to 100 µm. The porosity may be designed into the veil structure or be altered by stretching the veil using techniques known to those skilled in the art.

The veil can be colored in a variety of ways known to those skilled in the art such as dipping in a bath including the colorant, printing the colorant using screen, gravure, or flexographic printing, dyeing such as beck, jet, beam or jig; or by incorporating the colorant into the fiber when the veil is produced (solution coloration).

It is believed that by using a non-appertured or controlled porosity colored veil, the need to color the resin is obviated. The small average pore size veil (e.g. fabric) allows the resin of the thermosetting resin matrix to pass through the fabric during the manufacturing process, but the fabric still provides sufficient color or "cover" to result in an article having a substantial uniformity of color. In the past, colored veil fabric having larger average pore sizes have been used but required the resin to be colored for the uniformity to be acceptable. By obviating the need to add colorant to the resin, waste caused by not all of the colorant being at the surface is avoided. Also, concern about the color adversely affecting the properties of the resin matrix are eliminated, including the colorant inhibiting cure of the resin and thereby weakening the laminate.

Preferred veil structures include polyester fabrics, nylon fabrics, glass fabrics, aramid fabrics and rayon fabrics. Preferred films would be polyamide or polyester films with pores of the appropriate size formed into the structure. Veil fabrics can be produced from any of the known textiles fibers or blend of fibers; however, a preferred fabric for the non-appertured colored veil fabric are non-woven fabrics such as spunbonded or spunlaced polyester fabrics having a basis weight of from about 15 to 100 grams/square meter, and more preferably from about 20 to 60 grams/square meter. A particularly suitable fabric is a Norafing® spunlaced polyester nonwoven fabric available from Jacob Holm Corporation.

Suitable uncolored thermosetting resins for the matrix include, but are not limited to, unsaturated polyesters, phenolics, epoxies and vinyl esters, and the like, and blends and copolymers thereof. These thermosetting resins may also be mixed or blended with thermoplastic resins such as polyvinylacetate, styrene butadiene copolymers, polymethylmethacrylate, polystyrene, cellulose acetatebutyrate, saturated polyesters, urethane-extended saturated polyesters, methacrylate-butadiene-styrene copolymers and the like.

Suitable unsaturated polyester resins include practically any esterification product of a polybasic organic acid and a polyhydric alcohol, wherein either the acid or the alcohol, or both, provide the reactive ethylenic unsaturation. Typical unsaturated polyesters are those thermosetting resins made from the esterification of a polyhydric alcohol with an ethylenically unsaturated polycarboxylic acid. Examples of useful ethylenically unsaturated polycarboxylic acids include, but are not limited to, maleic acid, fumaric acid, iraconic acid, dihydromuconic acid and halo and alkyl derivatives of such acids and anhydrides, and mixtures thereof. Exemplary polyhydric alcohols include, but are not limited to, saturated polyhydric alcohols such as ethylene glycol, 1,3-propanediol, propylene glycol, 1,3-butanediol, 1,4-butanediol, 2-ethylbutane-1,4-diol, 1,5-pentanediol, 1,6-hexanediol, 1,7-heptanediol, 1,8-octanediol, 1,4-cyclohexanediol, 1,4-dimethylolcyclohexane, 2,2-diethylpropane-1, 3-diol, 2,2-diethylbutane-1,3-diol, 3methylpentane-1,4-diol, 2,2-dimethylpropane-1,3-diol, 4,5-nonanediol, di ethylene glycol, triethylene glycol, dipropylene glycol, glycerol, pentaerythritol, erythritol, sorbitol, mannitol, 1,1,1-trimethylolpropane, trimethylolethane, hydrogenated bisphenol-A and the reaction products of bisphenol-A with ethylene or propylene oxide.

Unsaturated polyester resins can also be derived from the esterification of saturated polycarboxylic acid or anhydride with an unsaturated polyhydric alcohol. Exemplary saturated polycarboxylic acids include, but are not limited to, oxalic acid, malonic acid, succinic acid, methylsuccinic acid, 2,2-dimethylsuccinic acid, 2,3-dimethylsuccinic acid, hydroxylsuccinic acid, glutaric acid, 2-methylglutaric acid, 3-methylglutaric acid, 2,2-dimethylglutaric acid, 3,3-dimethylglutaric acid, 3,3-diethylglutaric acid, adipic acid, pimelic acid, suberic acid, azelaic acid, sebacic acid, phthalic acid, isophthalic acid, terephthalic acid, tetrachlorophthalic acid, tetrabromophthalic acid, tetrahydrophthalic acid, 1,2-hexahydrophthalic acid, 1,3-hexahydrophthalic acid, 1,4-hexahydrophthalic acid, 1,1-cyclobutanedicarboxylic acid and trans-1,4-cyclohexanedicarboxylic acid.

Unsaturated polyhydric alcohols which are suitable for reacting with the saturated polycarboxylic acids include, but are not limited to, ethylenic unsaturation-containing analogs of the above saturated alcohols (e.g., 2-butene-1,4-diol).

Suitable phenolic resins include practically any reaction product of an aromatic alcohol with an aidehyde. Exemplary aromatic alcohols include, but are not limited to, phenol, orthocresol, metacresol, paracresol, Bisphenol A, p-phenylphenol, p-tert-butylphenol, p-tert-amylphenol, p-tert-octylphenol and p-nonylphenol. Exemplary aldehydes include formadehyde, acetaldehyde, propionaldehyde, phenylacetaldehyde, and benzaldehyde. Particularly preferred, are the phenolic resins prepared by the reaction of phenol with formaldehyde.

Suitable vinyl ester resins include practically any reaction product of an unsaturated polycarboxylic acid or anhydride with an epoxy resin. Exemplary acids and anhydrides include, but are not limited to, (meth)acrylic acid or anhydride, α-phenylacrylic acid, α-chloroacrylic acid, crotonic acid, mono-methyl and mono-ethyl esters of maleic acid or fumaric acid, vinyl acetic acid, cinnamic acid, and the like. Epoxy resins which are useful in the preparation of the polyvinyl ester are well known and commercially available. Exemplary epoxies include virtually any reaction product of a polyfunctional halohydrin, such as epichlorohydrin, with a phenol or polyhydric phenol. Suitable phenols or polyhydric phenols include for example, resorcinol, tetraphenol ethane, and various bisphenols such as Bisphenol-A, 4,4'-dihydroxydiphenylsulfone, 4,4'-dihydroxy biphenyl, 4,4'-dihydroxydiphenylmethane, 2,2'-dihydroxydiphenyloxide, and the like.

Typically, the thermosetting resin matrix of the present invention also includes a vinyl monomer, in which the thermosetting resin is solubilized. Suitable vinyl monomers include, but are not limited to, styrene, vinyltoluene, methyl methacrylate, p-methylstyrene, divinyl benzene, diallyl phthalate and the like. Styrene is the preferred vinyl monomer for solubilizing unsaturated polyester or vinyl ester resins. The thermosetting resin matrix typically also includes a thickening agent. Suitable thickening agents are commonly known to those skilled in the art and include, for example, crystalline unsaturated polyesters, polyurethanes, alkali earth metal oxides and hydroxides, and polyureas. The preferred thermosetting resin is unsaturated polyester resin.

The thermosetting resin is fiber-reinforced. Suitable fibers include, but are not limited to, fiberglass, polyester, graphite, aramid or natural fibers. The fibers may be in the form of roving or mat. Preferably, the reinforcing fiber comprises fiberglass roving.

The thermosetting resin may contain various other additives such as fillers, thixotropic agents, chemical thickening agents, release agents, flame retardants, and the like. Preferably the resin does not include a colorant or pigment.

An article of manufacture according to embodiments of the present invention is made utilizing various known FRP methods such as described in U.S. Pat. No. 5,935,498 to Vockel, Jr. et al., the disclosure of which is incorporated herein by reference in its entirety. For example, in one embodiment, pultrusion can be used to manufacture an article such as a ladder rail or a tool handle. Pultrusion is a process for fabricating a reinforced article of manufacture, such as a fiber reinforced plastic (FRP) article. The fiber roving and colored veil, preferably in fabric form, are saturated or wet-out with the uncured thermoset resin matrix. These saturated fiber roving and colored veil are then pulled through a heated, matched metal die or mold machined to the shape of the desired finished article. While in the die or mold, the time and temperature relationship of the die or mold to the resin matrix formulation transforms the resin matrix from a liquid to a solid. The die temperature is from about 270° to 450° F. This transformation is known as curing, cross-linking or polymerization. During this transformation, exothermic energy is generated in the chemical reaction.

In another embodiment, contact molding or open molding is used. The resin matrix and the fiber roving are manually (hand lay-up) or mechanically (spray-up) deposited on an open mold surface. The mold surface is preferably previously coated with a gel coat and is provided with the veil. Once the required amounts of fiber roving and resin matrix have been deposited on the mold, the laminate is worked with rollers, brushes or squeegees, usually manually, to remove any trapped air and to thoroughly saturate or wet-out the fiber rovings and veil with resin. Once this is completed, the laminate is allowed to cure, normally at ambient temperature.

Resin transfer molding (RTM) and structural reaction injection molding (S-RIM) are two similar closed mold FRP processes in which the fiber rovings and the veil are placed on one-half of the mold cavity, usually the bottom half. Once properly positioned, the top half of the mold is closed on the bottom half and secured in place. Next, the resin is injected slowly under minimal (e.g. 50 psi) pressure in RTM or rapidly under high pressure (e.g. 2000 psi) in S-RIM. The mechanical pumping and resulting pressure cause the air to be flushed out of the mold cavity and the resin to saturate or wet-out the fiber rovings. The resin impregnated reinforced article is then allowed to cure.

In another embodiment, compression molding is used. In this process, the veil, fiber rovings and the resin matrix are placed on one half, usually the bottom half, of the mold cavity. Once properly positioned, the top half of the mold is mechanically closed on the bottom half using a press which compresses the reinforcement package and resin under pressure (from 50 to 1500 psi) to flush out the air and thoroughly saturate or wet-out the veil and fiber rovings with resin matrix. It is then cured normally with the assistance of heat.

In yet another embodiment, filament winding is used in which fiber rovings are saturated with the resin matrix, normally by pulling them through a pan or bath containing the resin matrix. The reinforcements are then wound on a rotating mandrel in a specific pattern. The mandrel is covered with the resin matrix impregnated veil. One or more outer layers of the veil may be wrapped over the resin impregnated fiber rovings when required. Once the required amount of resin matrix, fiber rovings and veil are properly placed on the mandrel, the laminate is allowed to cure with or without the assistance of heat.

In still another embodiment, a continuous panel process is used. This process involves depositing a resin matrix on a carrier film which then passes under a fiber rovings deposition area. The article then goes through a compaction section where a series of belts, screens, or rollers force air out and thoroughly saturate or wet-out the veil fabric and fiber rovings with resin matrix. The veil is placed on either the top or bottom surface of the resulting saturated material and the veil is allowed to be saturated with the resin matrix. A carrier film is then applied to the top surface of the resulting article which is passed through a curing station where the resin matrix cures normally with the assistance of heat. Once cured, the carrier film is removed and the article is cut to the desired length. One skilled in the art will be able to select the specific molding technique depending on the article being manufactured.

These and other features of the present invention are additionally illustrated in connection with the following Examples, which are to be considered as illustrative of the present invention. It should be understood, however, that the invention is not limited to the specific details of the following Examples.

EXAMPLES 1-3

A non-appertured spunlaced polyester nonwoven veil fabric was obtained from Jacob Holm Corporation. The fabric had a basis weight of 60 grams/sq meter. The fabric was finished and dyed with the following aqueous mixture.

| Ingredient | % By Weight |
| --- | --- |
| Water | 81.28 |
| Aqua ammonia | 0.12 |
| Triton X-155 (surfactant) | 0.24 |
| Tamol 731a (dispersant) | 0.36 |
| Aerotex Resin M-3 (thermoset) | 0.60 |
| Rhoplex TR-407 (acrylic latex) | 10.8 |
| Acrysol G111 (thickener) | 0.72 |
| Freecat accelerator UTX-2 | 0.12 |
| Foampress ns-99 (defoamer) | 0.24 |
| Plasticolor Orange HMF(50-9492) | 5.40 |

The fabric was dipped into the chemical finish containing the orange colorant and the excess removed by padding. The wet add-on was 150%.

The fabric was then dried and cured on a pin-tenter oven. Air temperature for the drying was 204° C. Drying and curing time was approximately 48 seconds. The fabric was processed to produce three different degrees of "openness" by stretching 0%, 10%, and 19% respectively.

This produced three orange dyed fabrics with the properties in Table 1:

TABLE 1

| Test Property | Example 1 (0% stretch) | | Example 2 (10% stretch) | | Example 3 (19% stretch) | |
| --- | --- | --- | --- | --- | --- | --- |
| Basis Weight | 65.8 | grams/sq meter | 61.7 | gsm | 58.0 | gsm |
| Thickness | 15.0 | mils | 15.5 | mils | 14.2 | mils |
| Fraser Air Permeability | 255 | CRM | 298 | CRM | 314 | CRM |
| Pore size average* | 68 | microns | 41 | microns | 88 | microns |
| Minimum pore size | 41 | microns | 8 | microns | 25 | microns |
| Maximum pore size | 99 | microns | 107 | microns | 165 | microns |
| Pore size std dev. | 21 | microns | 26 | microns | 49 | microns |

*optically measured and averaged two largest pore dimensions.

These fabrics were then slit into tapes, suitable for input into a pultrustion process, and sent be pultruded into a ladder real "U" shaped profile.

The fabric was processed on a standard pultrusion machine. This machine draws glass roving, chopped strand glass mat, and the veil fabric, through a bath containing polyester resin, styrene, a catalyst, cure promoter, die lubricant, and UV protection additive, but missing the usual addition of colorant. The saturated fabrics and fibers are drawn into a heated die. The die was operated at a speed of 6 ft per minute and a temperature of from 275° F. at the entry of the die, to 320° F. at the exit. The process is driven by "pullers" that draw the finished part out of the mold.

In all three cases, an acceptable appearance was obtained without the use of any colorant in the resin.

Comparative Example 1 and Examples 4 and 5

Spunbonded polyester fabric was obtained from Tusco Corporation in three basis weights and configurations as follows:

| Property | Comparative Example 1 | Example 4 | Example 5 |
|---|---|---|---|
| Basis Weight (gsm) | 20 | 30 | 50 |
| Pore Size (μm) | 16-488 | 10-320 | 16-146 |

The fabrics were solution colored black. A resin matrix was formulated as follows:

| | | |
|---|---|---|
| 100 parts | Modified isophthalic polyester resin (Reichhold Dion 31031-00) | |
| 5 parts | Styrene (Fisher) | |
| 1 part | Tert-butyl perbenzoate (Trigonox C) | |
| 0.5 parts | Mold release (MoldWhiz) | |

Laminates were produced using two stainless steel plates shimmed with screws counterset into one plate to provide a gap when the two plates are stacked. A sheet of Mylar is placed on the bottom steel plate (the plate containing the screws), a sheet of fiberglass mat is placed on the Mylar and impregnated with the resin matrix, a second sheet of fiberglass mat is placed on top of the first and is again impregnated with resin matrix, the spunbond fabric samples are then laid onto the impregnated resin fiberglass bed and impregnated with the resin matrix, a top sheet of Mylar is placed over the resin matrix/fiberglass/spunbond fabric lay-up, the lay-up is covered with the top steel plate and the entire steel plate/lay-up assemble is placed into an autoclave press. The press is activated at 0.1 ton force and 275° F. for 2 minutes. The press is opened and the sample is removed and allowed to cool between the plates.

Comparative Example 1 was not acceptable due to uneven color and open spots. Examples 4 and 5 were acceptable, with the Example 4 laminate having a few small blotches and the Example 5 laminate having excellent color characteristics.

That which is claimed is:

1. A pultruded colored reinforced article of manufacture comprising a fiber-reinforced uncolored thermosetting resin matrix and a colored veil nonwoven fabric having a pore size average of about 10 μm to 350 μm.

2. A pultruded colored reinforced article of manufacture according to claim 1, wherein the colored veil fabric is a spunlaced or spunbonded nonwoven fabric.

3. The colored reinforced article of manufacture according to claim 2, wherein the spunlaced or spunbonded nonwoven fabric is a polyester fabric.

4. The colored reinforced article of manufacture according to claim 1 wherein the nonwoven fabric is polyamide fabric.

5. The colored reinforced article of manufacture according to claim 1 wherein the nonwoven fabric is glass fabric.

6. The colored reinforced article of manufacture according to claim 1, wherein the thermosetting resin matrix comprises a thermosetting resin selected from the group consisting of unsaturated polyester, phenolic, epoxies and vinyl ester resins.

7. The colored reinforced article of manufacture according to claim 1, wherein the thermosetting resin is unsaturated polyester resin.

8. The colored reinforce article of manufacture according to claim 1, wherein the article of manufacture is a ladder rail or a tool handle.

* * * * *